United States Patent [19]

Wiesner

[11] 4,142,140
[45] Feb. 27, 1979

[54] STEPPING MOTOR CONTROL CIRCUIT

[75] Inventor: Wolfgang Wiesner, Munich, Fed. Rep. of Germany

[73] Assignee: Siemens Aktiengesellschaft, Berlin & Munich, Fed. Rep. of Germany

[21] Appl. No.: 825,817

[22] Filed: Aug. 19, 1977

[30] Foreign Application Priority Data

Aug. 26, 1976 [DE] Fed. Rep. of Germany ....... 2638521

[51] Int. Cl.² .......................................... H02K 37/00
[52] U.S. Cl. .................................... 318/696; 318/138
[58] Field of Search ................. 318/696, 685, 254, 138

[56] References Cited
U.S. PATENT DOCUMENTS

| 3,991,355 | 11/1976 | Reehil et al. | 318/696 |
| 4,015,183 | 3/1977 | Miyakita | 318/696 |
| 4,079,297 | 3/1978 | Norrell | 318/696 |

Primary Examiner—Herman J. Hohauser
Attorney, Agent, or Firm—Hill, Gross, Simpson, Van Santen, Steadman, Chiara & Simpson

[57] ABSTRACT

A stepping motor control circuit incorporates two sources of pulses for driving a stepping motor, one of which has a frequency greater than the maximum frequency which the motor can follow. A pair of shift registers are used for effecting acceleration and deceleration of the stepping motor, when the high frequency pulse source is used. A first shift register stores an acceleration pulse sequence, to supply pulses to the stepping motor at an increasing rate, after which pulses are supplied directly to the stepping motor from the high frequency pulse source. The second shift register is energized to apply deceleration pulses to the stepping motor. Pulses having a relatively low frequency are supplied directly to the stepping motor when only a small motor movement is required.

12 Claims, 2 Drawing Figures

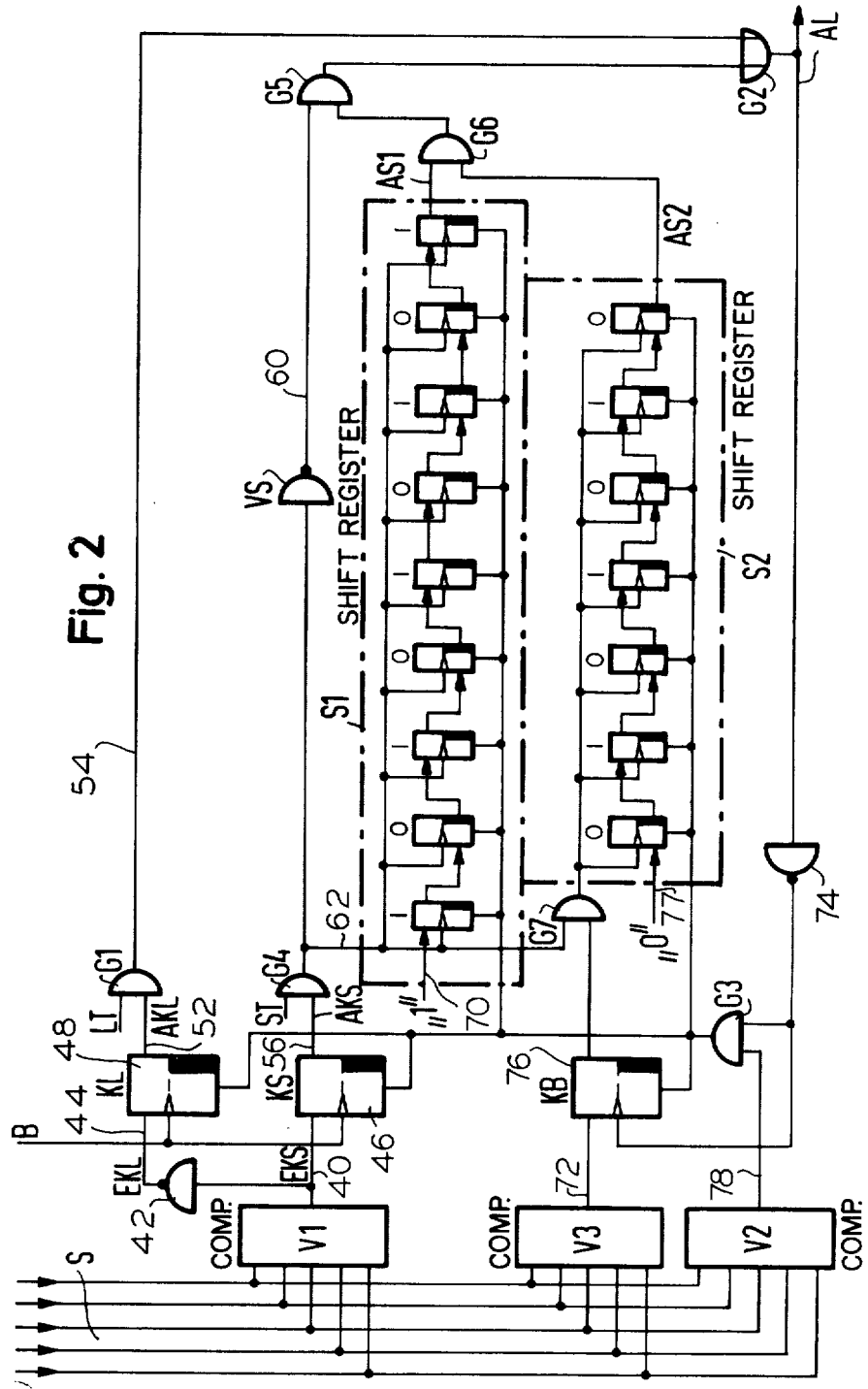

STEPPING MOTOR CONTROL CIRCUIT

BACKGROUND

1. Field of the Invention

The present invention relates to stepping motor control circuits, and more particularly to such circuits which are capable of accelerating and decelerating stepping motors.

2. The Prior Art

Stepping motor control circuits have been known which employ electrical control signals for transmitting a given number of pulses to a stepping motor to bring about a desired movement. However, such arrangements have been relatively complicated when high speeds are desired, employing the use of ramp generators and the like for controlling oscillators to produce signals with increasing and decreasing frequencies. And these arrangements generally do not function well for short movements. It is desirable to develop a simpler and more economical arrangement for controlling stepping motors than has been known in the prior art, and which functions well when only a few pulses are to be applied to the motor.

BRIEF DESCRIPTION OF THE PRESENT INVENTION

It is a principle object of the present invention to provide a stepping motor control circuit which is simple and economical.

Another object of the present invention is to provide such a circuit which is effective to accelerate a stepping motor near the beginning of its required travel, and decelerate it near the end of its required travel, without the use of any variable frequency oscillators or the like.

These and other objects and advantages of the present invention will become manifest by a review of the following specification in the accompanying drawings.

In one embodiment of the present invention there is provided a control circuit for a stepping motor incorporating two comparators for comparing the electrical signals representative of the number of steps to be taken by the stepping motor with fixed parameters, a source of low frequency pulses, a source of high frequency pulses, a first shift register, means connected to said first shift register and controlled by said first comparator for operating said first shift register during the initial portion of movement when the distance to be moved exceeds a first value, a second shift register, means connected to said second shift register and responsive to said second comparator for operating said second shift register when the distance to be moved is less than a second value, means connected to said high frequency source and to said first and second shift registers for supplying pulses to said stepping motor from the outputs of said shift registers, and means connected to said low frequency source for alternatively supplying pulses therefrom to said stepping motor.

BRIEF DESCRIPTION OF THE DRAWINGS

Reference will now be made to the accompanying drawings in which:

FIG. 2 is a functional block diagram of a portion of the apparatus of FIG. 1 illustrated in more detail.

DESCRIPTION OF THE PREFERRED EMBODIMENT

Figure 1:
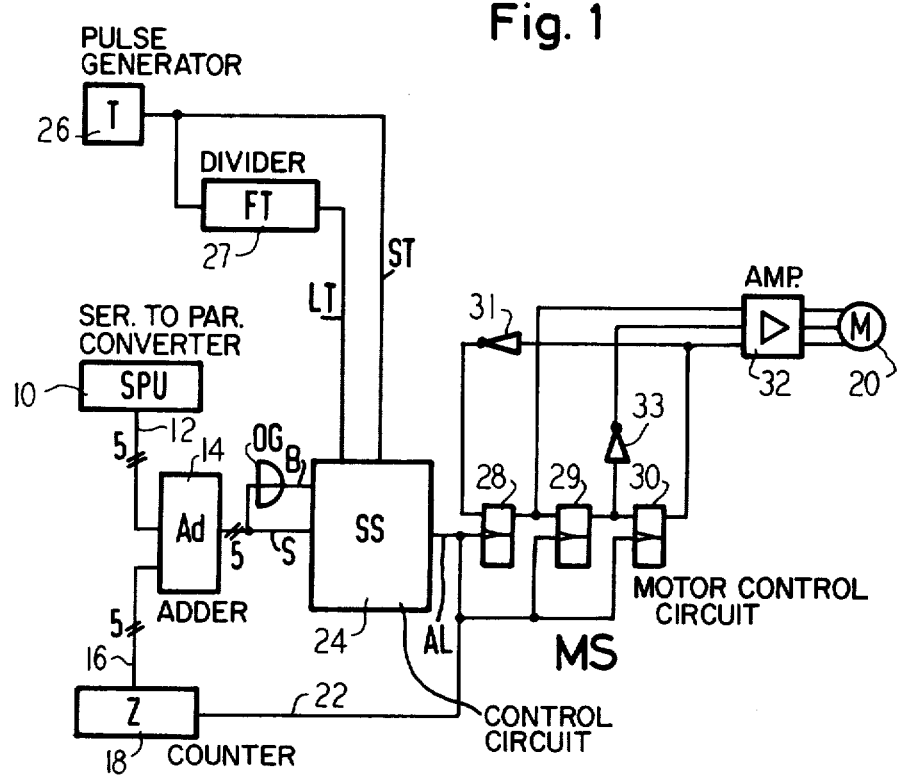
FIG. 1 is a functional block diagram of an exemplary embodiment of the present invention.

The apparatus of FIG. 1 is especially useful in conjunction with a teletype machine, in which a type disc or wheel must be quickly rotated by a stepping motor until a desired position is achieved, corresponding to a character to be printed. Typically each positioning of the type wheel must occur within a fixed time interval, so that it is necessary that the stepping motor be capable of high speed operation. It is also necessary that the motor be fully capable of operations which involve the operation or movement of only a few steps of the type wheel.

A teletype machine is not described in detail herein, but certain components which are well known portions of the machine will be referred to, in conjunction with the present invention. One component of the teletype machine is a serial-to-parallel converter SPU 10 which functions to transform a serial information format received for example over a transmission line, to a corresponding parallel format. The output of the SPU 10 is illustrated on lines 12, shown to be representative of five lines by the cross lines and the numeral "5". These five lines are connected to one input of a parallel adder 14, and five additional lines 16 are connected to a second input of the adder 14. The lines 16 originate as outputs of a counter circuit Z 18 which maintains an indication of the current position of the type wheel. The type wheel is driven by a stepping motor 20, and the counter 18 is incremented for each step of the motor 20, by signals supplied thereto over a line 22.

The function of the adder 14 is to effect a subtraction, so that an output lines S, there is a binary indication of the difference between a value represented by the lines 12 from that represented by the lines 16. The lines S are connected to inputs of a control circuit SS 24 which functions to provide pulses to a motor control circuit MS, which drives the stepping motor 20. A start pulse is supplied to the control circuit SS 24 over the line B through an OR gate OG to initiate operation of the control circuit 24. The start pulse is produced when any of the five lines S is changed to indicate that the value represented by the output of the adder 14 is not zero, so that a cycle of operation of the control unit SS 24 is required.

A pulse generator T 26 is provided for supplying a stream of pulses having a high repetition rate for example 1,000 Hz. These pulses are supplied to the circuit SS 24 over line ST, and a series of pulses having a lower pulse repetition rate is supplied to the control circuit SS 24 over a line LT. A frequency divider FT 27 is connected between the output of the pulse generator T 26 and the line LT, so that the pulse repetition rate on the line LT is a sub-harmonic of that on the line ST. In preferred embodiment, the pulse repetition rate on the line LT is 500 Hz. The rate of the pulse generator T 26 is chosen above the maximum rate which the motor 20 can follow, from a standing start. The frequency of the pulses from the divider 28 is below such maximum rate.

The control circuit SS 24 may supply either the fast pulses on the line ST or the slow pulses on the line LT to the output AL, which is connected to the line 22. The output AL is also connected to three flip-flops 28-30 which make up the motor control circuit MS. The flip-flops 28-30 are connected to form a shift register, with the output of each flip-flop being connected to an input of the succeeding flip-flop, and with the output of the flip-flop 30 being connected to the input of the flip-flop 28 by an inverter 31. The outputs of the three flip-flops are connected to an amplifier unit 32, which directly drives the stepping motor 20. An inverter 33 is interposed between the output of the flip-flop 29 and the amplifier 32.

As the motor control circuit MS constitutes no prior art of the present invention, it will not be described in any greater detail. The apparatus constituting the control circuit SS 24 is illustrated in FIG. 2 and will now be described.

The five lines S are illustrated in FIG. 2 as being connected to the inputs of three comparators V1, V2 and V3. The comparator V1 compares the data represented by the signals on the lines S to a fixed value, and produces a control signal on its output line EKS 40 if the data represented by the signals on the lines F exceeds such value. The value is chosen in order to identify whether the number of steps to be moved by the stepping motor is sufficiently great as to require the pulses produced during the acceleration and deceleration phases. If the value is not that great, the voltage level on the line 40 assumes a relatively low value. The line 40 is connected by means of an inverter 42 to a line EKL 44, so that the voltage level on the lines 40 and 44 assume alternate values. The line 40 is connected to the clocked set input of a KS flip-flop 46, and the line 44 is connected to the clocked set input of a KL flip-flop 48. Whichever of the flip-flops 46 and 48 is set, will determine whether the low frequency pulses on the line LT or the high frequency pulses on the line ST will be supplied to the output line AL.

One or the other of the flip-flops 46 and 48 is set at the time of the start pulse supplied over the line B to the clock input of the flip-flops, when the data represented by the lines S assumes a non-zero value. If the flip-flop 48 is set at this time, it produces an output on the AKL line 52 which is connected at one input of an AND gate G1. The other input of the gate G1 is connected to the LT line, and its output is connected over a line 54 through an OR gate G2 to the output line AL.

If the flip-flop 46 is set by the start pulse on the line B, it produces an output on the AKS line 56, which is connected to one input of an AND gate G4. The other input of the AND gate G4 is connected to the line ST, so that fast pulses are supplied to the output of the gate G4 when the KS flip-flop is set. The output of the gate G4 is connected through an inverter VS to a line 60, which is connected to one input of an AND gate G5. The other input of the AND gate G5 is connected to the output of an AND gate G6, the two inputs of which are connected to outputs of two shift registers S1 and S2. The output of the shift register S2, on the line AS2, is normally high, so that the AND gate G6 normally functions to pass the output of the shift register S1 on the line AS1 directly to the input of the gate G5. If the output of the shift register S1 is high at any time that the output of the shift register S2 is also high, the inverted ST pulses are passed by the gate G5 to the OR gate G2, from which they are supplied to the output line AL. When the output of the shift register S1 is low, the gate G5 is blocked.

The shift register S1 is advanced at the rate of the ST pulses, when the gate G4 is operated, by pulses supplied over the line 62 connected to the output of the gate G4. Initially, the content of the shift register S1 is zero, in every stage, but because of the way in which successive flip-flops are connected together, a different content is simulated by the flip-flops, as illustrated in FIG. 2 by the numerals directly above each flip-flop. Thus, the flip-flop to which the output AS1 is connected initially stores a one, the two preceding flip-flops store zeros, etc. Since the line AS1 is high at the time of the start pulse on the line B, the first inverted ST pulse applied to the line 60 is passed by the gates G5 and G2. The shift register S1 is advanced by the ST pulses, so that during the second cycle, the last flip-flop of the shift register S1 stores the zero, cutting off the gates G5 and G6 and preventing pulses on the line 60 from reaching the output. As the shift register is advanced by successive ST pulses, the ST pulses are either passed or blocked by the gate G5, in accordance with the sequence of ones and zeros initially stored in the shift register S1. As the first flip-flop of the shift register is connected permanently to a voltage level representative of a one by means of a line 70, the output from the last flip-flop on the line AS1 remains high, after the data initially set in the shift register has been entirely shifted out. The shifting out of the initial data corresponds to the acceleration period, in which some ST pulses, but not others, are allowed to reach the output line AL. After the acceleration period, when the initial content of the shift register S1 has been entirely shifted out, all of the ST pulses are passed by the gate G5, so that the motor is stepped at its maximum velocity, corresponding to the frequency of the fast pulses on the line ST.

The pulses on the output line AL, operate to change the condition of the Z counter 18, in such a way that the output of the adder 14 is reduced, as the type wheel is rotated toward its desired position. The comparator V3 compares the data represented by the signals on the lines S with a fixed value, and produces a control signal on its output line 72 when the value represented by the data on the lines S has been reduced to less than a predetermined value, corresponding to a few steps of the stepping motor away from the desired position. When that occurs, the next pulse applied to the line L is passed through an inverter 74 to the clock input of a KB flip-flop 76, and the flip-flop 76 is set, by virtue of the high level on the line 72 connected to its clocked set input. The output of the KB flip-flop 76 is connected to one input of the gate G7, the other input which is connected to the output of the gate G4. The gate G7 is connected to the clock inputs of the flip-flops making up the shift register S2, so that the data initially stored therein is advanced, and becomes available on the output line AS2. The data initially stored in the flip-flop S2 is indicated in FIG. 2, and it is apparent that as this data is shifted out, the gate G6 will sometimes be disabled, thereby blocking transmission of the inverted ST pulses to the gate G5. In this way some pulses are emitted, reducing the pulse repetition rate of the pulses applied to the output line AL.

The first flip-flop of the shift register S2 is connected to a voltage value representative of "zero" by means of the line 76, so that when the data in the shift register S2 is completely shifted out, the gates G5 and G6 remain blocked, so that no further pulses can pass through them. This corresponds to the desired position of the stepping motor, however, so that no further pulses are required. The fixed value with which the data on the lines as compared by the comparator V3, is such that when this value is recognized, only the number of pulses which can be supplied by way of the shift register S2 are required to be supplied for the stepping motor to arrive at its final desired position.

The comparator V2 senses when the desired position is reached, when the data represented by the lines S is zero. It then produces a control signal on an output line 78, which is connected to one input of an AND gate G3, the other of which is connected to the output of the inverter 74. The output of the AND gate G3 functions to reset the flip-flops 46, 48 and 76, and to make the initial setting of the flip-flops in the shift registers S1 and S2, preparatory to a subsequent cycle of operation initiated by a start pulse on the line B.

The circuit arrangement of the present invention achieves the advantageous result of being able to accelerate the stepping motors with an increase in pulse repetition rate in a few individual steps, employing a very simple circuit. It allows a maximum speed of the stepping motor after the acceleration phase is completed, and allows a deceleration phase in a few steps by use of a very simple circuit. When the number of pulses to be supplied is so few that the acceleration and deceleration modes of operation are not required, a low frequency source of pulses is employed.

The slow speed KL flip-flop 48 is set whenever the number of steps to be moved by the stepping motor is less than the pulses which are provided by an operation of the shift registers S1 and S2 as described above. The specific initial settings of the shift registers S1 and S2 as illustrated in FIG. 2 are merely exemplary, and the specific initial setting may be readily changed depending on the characteristics of the stepping motor to be used. This may be done either by connecting the "reset" line from the gate G3 to selected "set" and reset" inputs of the flip-flops making up the shift register, or by modifying the connections between adjacent stages of the shift register. In the latter event, the shift register S1 must still produce ones at its output after the acceleration period, and the shift register S2 must still produce zeros after its content has been shifted out. The frequencies of the fast and slow pulses on the lines ST and LT can also be chosen in accordance with specific requirements, for controlling motors of different characteristics. The shift registers can have more stages if longer acceleration and/or deceleration phases are desired.

It will be apparent that other additions and modifications may be made by those skilled in the art without departing from the essential features of novelty of the present invention, which are intended to be defined and secured by the appending claims.

What is claimed is:

1. A stepping motor control circuit including a first generator for producing pulses having a pulse repetition rate less than the maximum starting frequency of said stepping motor, a second pulse generator for producing pulses having a pulse repetition rate greater than said maximum frequency, connecting means connected to said stepping motor for supplying said motor with pulses either at the frequency of said first pulse generator or at the frequency of said second pulse generator, control means for said connecting means for selecting the frequency of pulses, means for producing an acceleration pulse sequence, means for producing a deceleration pulse sequence, and means for supplying said acceleration and deceleration pulse sequences to said stepping motor when the frequency of said second pulse generator is selected.

2. Apparatus according to claim 1 including means for selectively blocking certain pulses of said second pulse generator from reaching said stepping motor, said acceleration pulse sequence and said deceleration pulse sequence comprising unblocked pulses of said second pulse generator.

3. Apparatus according to claim 2 including means for developing a signal representative of the difference between the desired and actual positions of said stepping motor, comparator means responsive to said difference in excess of a predetermined value for initiating said acceleration pulse sequence, a first shift register connected to said first comparator and responsive thereto for producing a timing pulse sequence, means connected with said second pulse generator and with said first shift register for producing said acceleration pulse sequence, a second comparator responsive to said difference being less than a second predetermined value, a second shift register connected to and responsive to said second comparator for producing a deceleration pulse sequence, and means connected with said second pulse generator and said second shift register for selectively blocking certain of said pulses in accordance with said deceleration sequence.

4. Apparatus according to claim 1, including means for developing a signal representative of the difference between the desired and actual positions of said stepping motor, said control means comprising a comparator for selecting the frequency of said first pulse generator when said difference is less than a predetermined value, and for selecting the frequency of said second pulse generator when said difference is greater than said predetermined value.

5. Apparatus according to claim 4, including means for developing a start pulse when said difference assumes a non-zero value, and means connected to said control means for selecting the frequency of pulses contemporaneously with said starting pulse.

6. A control circuit for developing a predetermined pulse sequence at the initiation of an event, comprising, in combination; a pulse generator, a shift register, means for presetting the stages of said shift register to a given set of states such that a predetermined sequence of signals is developed at the serial output of said shift register when content of the shift register is shifted out, means connecting said pulse generator to the clock input of said shift register, and gate means connected with said pulse generator and with said serial output to provide a predetermined pulse sequence corresponding to the content of said shift register during an initial period when the content of said shift register is shifted out, and a different pulse sequence after the content of said shift register is shifted out.

7. Apparatus according to claim 6, wherein said gate means functions to block certain ones of the pulses produced by said pulse generator during said initial period.

8. Apparatus according to claim 7, wherein said gate means functions to unblock all of said pulses following said initial period.

9. Apparatus according to claim 7, wherein said gate means functions to block all of said pulses following said initial period.

10. Apparatus according to claim 6, including a stepping motor, said first pulse generator having a pulse repetition rate greater than the maximum starting frequency of said stepping motor, connecting means for connecting said gate to said stepping motor, whereby said stepping motor is accelerated during said initial period and driven by pulses from said pulse generator after said initial period.

11. Apparatus according to claim 10, including a second pulse generator having a pulse repetition rate less than the maximum starting frequency of said stepping motor, and control means for selectively connecting said stepping motor to said second pulse generator or to said gate means.

12. Apparatus according to claim 11, including means for developing a signal representative of the number of steps which said stepping motor is to take, said control means being connected to said last-named means and responsive thereto.

* * * * *